an application to the solid dosage form, resulting in a tablet or capsule of such large size as to cause difficulty in its administration.

United States Patent Office 3,274,055
Patented Sept. 20, 1966

3,274,055
ACID ADDITION SALTS OF MORPHOLINE ETHANOL
Alfred Halpern, Great Neck, Lake Success, N.Y., assignor to Synergistics Inc., New York, N.Y., a corporation of New York
No Drawing. Filed Jan. 21, 1965, Ser. No. 427,164
9 Claims. (Cl. 167—65)

The present invention relates to new and novel derivatives of morpholine ethanol, having novel pharmaceutical and therapeutic properties, their methods of manufacture and methods for achieving a tranquilizing muscle-relaxant effect. In particular, it relates to certain salts of morpholine ethanol, as for example, morpholine ethanol citrate, morpholine ethanol tartrate, morpholine ethanol salicylate, morpholine ethanol glutamate, morpholine ethanol nicotinate, morpholine ethanol malate, and morpholine ethanol maleate, as well as certain esters of morpholine ethanol, as for example, morpholine ethyl mandelate, morpholine ethyl tropate and morpholine ethyl carbamate, the methods for their preparation and the methods of achieving a therapeutic effect by utilizing these compounds.

The present application is a continuation-in-part of applicant's copending application, Serial No. 243,646, filed December 10, 1962, which was a continuation-in-part of applicant's then copending application, Serial No. 101,346, filed April 7, 1961, both now abandoned.

Morpholine ethanol is a cyclized tertiary amino alcohol with an empiric formula of $C_6H_{13}O_2N$. The compound is a colorless liquid having a molecular weight of 131.2 and a boiling point of 226° C. The refractive index ($n_D^{20}$) of the molecule is 1.4765, while the specific gravity at 20° relative to water at the same temperature, is 1.072. Morpholine ethanol has been studied for its relative toxicity in connection with cancer chemotherapy and found to be essentially non-toxic. The $LD_{50}$ of morpholine ethanol is 12.06 gm./kg., which is about the same magnitude as that of ethanol. Morpholine ethanol has been shown to have mild muscle-relaxant properties. Morpholine ethanol is a liquid, capable of being converted into a solid by forming salts, as for example, the hydrochloride and hydrobromide salts. When the organic salts are prepared, as for example, the acetate, formate, lactate, butyrate and stearate, the resultant compounds are oily, but when certain dibasic acids are used, such as the succinic acid, a solid compound will result.

All of the salts of morpholine ethanol described in the literature are markedly hygroscopic, particularly the organic acid salts. This undesirable pharmaceutical property of being hygroscopic limits the utility of the compound for the manufacture of solid dosage forms. Thus, when the hydrochloride or hydrobromide salts and the organic acid salts are used, special drying agents must be added as well as humidity-controlled manufacturing room utilized, and special moisture resistant coatings place about the finished solid dosage forms to provide stability. These precautionary steps and added ingredients markedly increase the cost of manufacture of these agents as well as to interfere with proper absorption and therapeutic efficacy of the active ingredient. Furthermore, the use of these additive materials increase the size of the solid dosage form, resulting in a tablet or capsule of such large size as to cause difficulty in its administration.

Through the use of the salts of the present invention, solid derivatives of morpholine ethanol are obtained which are not hygroscopic and are suitable for tablet, capsule and suppository manufacture, without the necessity for adding additive preservatives against liquifaction by inherent hygroscopicity. Furthermore, it will be found that the new compounds of the present invention are useful to produce a tranquilizing action in those patients suffering from anxiety states, and are safe and effective for use in animals and humans. These new agents do not cause injury to the liver; are not narcotic and not apt to cause addiction. It will be found that the administration of these new derivatives of morpholine ethanol by either the oral, rectal or parenteral routes will exert a beneficial therapeutic action. It will also be found that certain esters of morpholine ethanol exhibit a new and novel desirable pharmacologic action in that they produce a tranquilizing effect without superimposing a general depressive action. Such esters as morpholine ethyl tropate, morpholine ethyl mandelate and morpholine ethyl carbamate, are capable of producing a tranquilizing action. Morpholine ethyl tropate and morpholine ethyl mandelate are oily compounds, insoluble in water but soluble in organic solvents.

They may be formed into solid derivatives through the formation of the inorganic or organic acid salts of the respective esters. Morpholine ethyl carbamate is a solid and is also capable of salt formation. Thus, the hydrochloride, hydrobromide or the sulfate salts of these esters may be prepared, as well as the acetate, succinate, citrate salts, to illustrate the scope of organic-acid salt formation. These salts are not hygroscopic and are suitable for solid dosage form administration, as well as for dissolution in a liquid carrier. The new non-hygroscopic salts of morpholine ethanol are obtained by reacting the appropriate acid, as for example, nicotinic acid, salicylic acid, glutamic acid, citric acid, tartaric acid, maleic acid and malic acid, with morpholine ethanol in an inert solvent. Stoichiometric equivalent amounts of the respective reagents are used. An inert solvent, such as water, ethanol, isopropyl alcohol, dioxane, tetrahydrofurane or mixtures of these, may be used, as well as any other inert solvent in which the reagents are mutually soluble. The reagents are dissolved separately in the solvent and the solution of the acid component added slowly to the solution of the base component, while the mixture is being stirred. Gentle heat may be utilized to facilitate the reaction but this is not essential. The respective salt is obtained by fractional crystallization and is isolated and dried.

The esters, morpholine ethyl tropate and morpholine ethyl mandelate, are prepared by reacting morpholine ethanol with the respective acid in the presence of a dehydrating agent, as for example, sulfuric acid. In carrying out this reaction, a solvent is not necessary and the selected acid component is added directly to an excess of morpholine ethanol, together with 0.5 ml. of concentrated sulfuric acid. The mixture is heated to a temperature of about 110° to 120° C., for a period of from 4 to 10 hours, and the respective ester isolated by vacuum distillation.

Should it be desired to utilize a solvent for this reaction, then an inert solvent such as hexane, xylene, benzene and chloroform may be used. When a solvent is utilized, a ratio of 5 volumes of the solvent for each volume of morpholine ethanol used, is preferred. The reaction is then conducted at the reflux temperatures of the particular solvent selected for a period of from 4 to 10 hours. In place of the acid described above, may be used, the anhydride of the respective acid, utilizing the same steps.

Still another technique may be utilized to form the respective esters and that is, to react the metallic salt of the appropriate acid with N-morpholine-beta ethyl halide. Either the chloride or the bromide of N-morpholine-beta ethyl halide may be used, and the alkali metal salt of the appropriate acid is preferred, although the copper and silver salts may also be used. When the metallic acid salt is utilized to form the ester, the reaction may be catalyzed through the addition of small amounts, as for example, 0.5 gram per mol, of silver hydroxide or finely divided copper powder. The reaction is conducted in an inert medium, as for example, water, ethanol or isopropyl alcohol, or mixtures of these. A solution or a suspension of the metal salt of the respective acid is prepared in the inert solvent and to this is added a solution of N-morpholine-beta ethyl halide, dissolved in the same solvent. Copper powder or silver hydroxide is added, as preferred, and the mixture refluxed for a period of at least 1 hour. At the end of this time, the mixture is cooled, filtered and the solvent removed by distillation. The residue is vacuum distilled to isolate the respective ester.

Morpholine ethyl carbamate is prepared through the reaction of N-morpholine ethanol and ethyl carbamate. The ethyl carbamate is dissolved in the N-morpholine ethanol and the mixture is refluxed for a period of at least 8 hours, under a pressure of 25 mm. Hg. At this pressure, N-morpholine ethanol boils at 119° to 120° C. After the period of refluxing is terminated, then the excess N-morpholine ethanol is distilled at reduced pressure (25 mm. Hg) and the residue crystallized from ethanol. The resulting product, N-morpholine ethyl carbamate is a solid compound, insoluble in water, but soluble in chloroform and readily soluble in alcohol. Other suitable means for forming N-morpholine ethyl carbamate may be used, as the reaction between phosgene and N-morpholine ethanol to form the N-morpholine chloroformate and then reacting the latter compound with ammonia to form the N-morpholine ethyl carbamate.

Because the above mentioned compounds (viz. the salts of morpholine ethanol and the esters and their salts, described above) are essentially non-toxic and particularly suitable for use in therapy, tablets, capsules, suppositories, or solutions may be prepared to contain a dosage range of 100 mg. to 750 mg. of the active therapeutic compound per unit dose, which may be administered from 1 to 6 times daily.

In preparing a tablet of the active ingredient, which may be either the ester, or its salt, or the pharmaceutically acceptable salt of N-morpholine ethanol, it is desirable to make a base granulation containing a diluent, as for example, powdered sucrose, powdered lactose, powdered corn starch or powdered potato starch; a lubricating agent, as for example, calcium or magnesium stearate and a granulating agent, as for example, gelatin, acacia, tragacanth, etc. Suitable coloring and flavoring may also be added to the base granulation. To this base granulation is then added the appropriate quantity of the pharmaceutically useful salts of morpholine ethanol, or a therapeutically equivalent quantity of morpholine ethyl mandelate, morpholine ethyl tropate or morpholine ethyl carbamate, and the whole intimately mixed. To facilitate the uniform incorporation of the active ingredient into the tablet base granulation, it may be first dissolved in ethanol, using an amount just sufficient to achieve solution. In the ordinary course of manufacturing, it will be found convenient to utilize a volume of ethanol which is approximately twice that of the weight of active ingredient to be incorporated.

The mixture is uniformly moistened and screened through a coarse screen (No. 4 to 12 mesh), the size of screen depending upon the properties of the moistened material. The dampened material is then spread on drying trays, in thin layers, and dried at temperatures ranging between 45° and 60° S. When dry, the mixture is granulated through a No. 16 or No. 20 mesh screen and compressed into the desired tablet size and shape.

If it is desired to utilize the active ingredients, either the ester, or its salt, or the salt of N-morpholine ethanol, in the form of capsules medication, then it may be preferred to mix the appropriate active therapeutic compound with a diluent or carrier, as for example, powdered corn starch, powdered lactose, powdered sucrose or powdered potato starch. The ratio of diluent to active ingredient may range from equal parts to one part of active ingredient in nine parts of diluent. After thorough mixing, the dry mixture is then filled into the desired capsule.

The preparation of suppositories for rectal administration may be conveniently carried out by mixing the active ingredient, either the ester, or its salt or the salt of N-morpholine ethanol with the desired suppository base material. Among the pharmaceutically desirable suppository bases which may be employed for this purpose, are Carbowax, cocoa butter or glycerin-gelatin mixtures. Whatever the base utilized, the manufacturing procedures utilized are essentially the same.

The active ingredient is incorporated by trituration with an appropriate quantity of suppository base compound. The mixture is then molded into the desired shape and size.

Solutions for parenteral use are prepared by dissolving the appropriate quantity of active material-for-injection, utilizing an aseptic technique and filling into glass ampules which are sealed by heat. The solution may be sterilized by autoclaving in the conventional manner.

Solutions for oral use are prepared by dissolving the active ingredient in a suitable vehicle, consisting of either sugar syrup, glycerin, propylene glycol, polyoxyethylene glycol, sorbitol, ethanol and water, or mixtures of these. Suitable aromatic and coloring agents may be added when desired. The concentration of active substance should be adjusted so that preferably one teaspoonful (5 ml.) constitutes a unit-dose, although larger volumes may be used. The following examples illustrate the scope of this invention.

EXAMPLE 1

In a round-bottom glass boiling flask fitted with a reflux condenser, a stirrer and an inlet tube, is placed a solution of 0.1 mol of morpholine ethanol (B.P. 226° C., refractive index ($n_D^{21}$), 1.4765) dissolved in 500 cc. of isopropyl alcohol. To this solution is added 0.1 mol of nicotinic acid dissolved in 200 cc. of isopropyl alcohol and the whole warmed at temperatures not exceeding 80° C. for one hour. The mixture is cooled and the solvent is distilled. The resultant residue is dissolved in the least amount of boiling water and allowed to cool. The nicotinic acid salt of morpholine ethanol are tan, needle-shaped crystals, melting at 223–226° C.

The compound analyzes in good agreement with the theoretical values for carbon, hydrogen and nitrogen.

Theory: C, 56.66%; H, 7.14%; N, 11.02%. Found: C, 59.59%; H, 6.12%; N, 10.74%.

Morpholine ethanol nicotinate is soluble in water and alcohol and insoluble in benzene and petroleum ether.

EXAMPLE 2

In place of the nicotinic acid used in Example 1, there may be substituted stoichiometric equivalent quantities of tartaric acid, citric acid, maleic acid, malic acid, glutamic acid and salicyclic acid. The remainder of the steps are the same and the respective salt of morpholine ethanol, of the appropriate acid used, is obtained. The physical-chemical properties are described in Table I.

form the soluble double salts or to extend the reflux period to approximately 4 to 16 hours.

*Table I.—Elemental analysis*

| Useful Salt | Empiric Formula | Physical Properties of Salts of N-morpholine Ethanol | | | | | | Solubility |
|---|---|---|---|---|---|---|---|---|
| | | Physical State | Percent Carbon | | Percent Hydrogen | | Percent Nitrogen | |
| | | | Theory | Found | Theory | Found | Theory | Found | |
| N-morpholine ethanol tartrate | $C_{10}H_{19}NO_8$ | Solid needles, M.P. 145° C. | 42.68 | 42.91 | 6.81 | 6.95 | 4.98 | 5.12 | Soluble in water and ethanol. |
| N-morpholine ethanol malate | $C_{10}H_{19}NO_7$ | Solid needles, M.P. 45° C. (softens at 40° C.). | 45.26 | 44.92 | 7.22 | 7.43 | 5.28 | 5.44 | Do. |
| N-morpholine ethanol maleate | $C_{10}H_{17}NO_6$ | Low melting solid.[a] | 48.56 | 47.46 | 6.93 | 7.18 | 5.67 | 5.44 | Do. |
| N-morpholine ethanol glutamate | $C_{11}H_{22}N_2O_6$ | Platelets, M.P. 211–213° C. | 47.45 | 46.99 | 7.97 | 6.39 | 10.07 | 9.53 | Soluble in water and insoluble in ethanol. |
| N-morpholine ethanol nicotinate | $C_{12}H_{18}N_2O_4$ | Tan needles, M.P. 223–226° C. | 56.66 | 56.59 | 7.14 | 7.12 | 11.02 | 10.34 | Soluble in water and ethanol. |
| N-morpholine ethanol citrate | $C_{12}H_{21}NO_9$ | Needles, M.P. 105–108° C. | 44.56 | 44.21 | 6.55 | 6.24 | 4.33 | 4.01 | Do. |
| N-morpholine ethanol salicylate | $C_{13}H_{19}NO_5$ | Needles, M.P. 60–62° C. | 57.96 | 58.42 | 7.12 | 7.40 | 5.20 | 5.41 | Do. |

[a] N-morpholine ethanol maleate is a low melting solid, softening at about 28° C., and is liquid above 30° C. It has a refractive index ($n_D^{25}$) of 1.4979 and a specific gravity ($d_4^{25.0}$) of 1.2543.

EXAMPLE 3

In a round-bottom boiling flask is placed 16.6 gm. of tropic acid and 100 cc. of ethanol. To this are added 100 cc. of 4 percent (w./v.) alcoholic sodium hydroxide solution. When all of the tropic acid has dissolved, 15 gm. of 4-(beta-chloroethyl) morpholine, dissolved in 100 cc. of ethyl alcohol and 0.5 cc. of sulfuric acid are added. The reaction mixture is heated to boiling and after a few minutes, a colloidal "clouding" will be observed, which indicates formation of the insoluble ester, morpholine ethyl tropate. One hundred cc. of ethyl alcohol are then added. The reaction mixture is refluxed over a four hour period, at which time the synthesis of the ester is virtually complete and the solvent removed under reduced pressure. The residue is an oil which is purified by distillation at 0.2 mm. Hg. The resultant oil, morpholine ethyl tropate, is insoluble in water, but soluble in the usual organic solvents, as for example, ethanol, ether, benzene and acetone. The compound analyzes for 59.3 percent tropic acid and 40.7 percent morpholine ethanol. The compound may be solubilized in aqueous acid solution below pH 3 through the formation of its acid salt.

EXAMPLE 4

In place of the tropic acid used above, there may be substituted an equimolar quantity of mandelic acid. The remainder of the steps being the same and the resultant compound obtained being morpholine ethyl mandelate. This compound is an oil which is insoluble in water, although it is soluble in aqueous acid. The compound is soluble in the usual organic solvents such as ethanol, ether, benzene and acetone. The compound analyzes for 57.1 percent of mandelic acid and 42.9 percent of morpholine ethanol.

EXAMPLE 5

In place of the sodium hydroxide used in Example 3 above, there may be substituted in equimolar quantities, potassium hydroxide or calcium hydroxide. Silver hydroxide, magnesium hydroxide, copper hydroxide and lead hydroxide may also be substituted for the sodium hydroxide, but these form insoluble salts with both tropic acid and mandelic acid. However, this does not interfere with the course of the reaction except that it would delay the rate of reaction. Consequently, when these latter metal hydroxides are utilized, it may be desirable to add small quantities of sodium or potassium hydroxide to form the soluble double salts or to extend the reflux period to approximately 4 to 16 hours.

EXAMPLE 6

One-tenth mol of morpholine ethanol is dissolved in 200 cc. of benzene contained in a round bottom flask, fitted with a reflux condenser and a graduated water-trap. To this solution is then added 15.2 gm. of mandelic acid and the mixture heated to boiling until refluxing begins. At this point, 0.5 cc. of concentrated sulfuric acid is added, and the refluxing continued over a period of from 24 to 72 hours, or until the theoretical molar percentage of water is fractionated. The reaction is then stopped and 100 cc. of water is added to the mixture and is followed by small increments of sodium bicarbonate until neutralization of the acidity, is achieved. The water layer is then separated from the benzene layer and the benzene layer dried over anhydrous sodium sulfate. The benzene is then distilled at atmospheric pressure and the residue vacuum distilled at 0.2 mm. Hg. The resulting product is morpholine ethyl mandelate, conforming to that obtained as a result of Example 4 above.

EXAMPLE 7

In place of the mandelic acid used in Example 6 above, there may be substituted an equimolar quantity of tropic acid. The remainder of the steps being the same and the resultant compound being morpholine ethyl tropate, conforming to that obtained after Example 3, above.

EXAMPLE 8

In a glass reaction vessel is placed 4 mol of N-morpholine ethanol and 1 mol of ethyl carbamate. The mixture is refluxed for a period of at least 8 hours, while maintaining the pressure inside the reaction vessel at 25 mm. Hg. At this pressure, N-morpholine ethanol will reflux at 119°–120° C. After the period of refluxing is terminated, the excess N-morpholine ethanol is distilled at a pressure of 25 mm. Hg and the residue crystallized from ethanol. The resultant product, N-morpholine ethyl carbamate, is a solid compound, insoluble in water but soluble in chloroform and alcohol.

EXAMPLE 9

In a glass reaction vessel is placed a solution of 0.1 mol of N-morpholine ethanol dissolved in 500 ml. of chloroform. Exactly 0.1 mol of phosgene is added to the solution and the whole stirred, while maintaining the temperature between 0° to 5° C. The chloroform is removed by vacuum distillation and the residue taken up in 100 cc.

of 28 percent ammonia-water. After standing overnight, the mixture is extracted with benzene, the benzene solution is dried and set aside to crystallize. The resultant crystals are N-morpholine ethyl carbamate, corresponding to the product obtained as a result of Example 8 above.

EXAMPLE 10

Acid salts of the respective esters, N-morpholine ethyl tropate, N-morpholine ethyl mandelate and N-morpholine ethyl carbamate, may be prepared by reacting an equivalent of the appropriate acid, as, for example, hydrochloric acid, hydrobromic acid, sulfuric acid, phosphoric acid, tartaric acid, glutamic acid, citric acid and succinic acid, in an inert solvent. Such solvents as water, ethanol, isopropyl alcohol, acetone, chloroform or benzene may be used. Under certain circumstances, it may not be desired to isolate the resultant acid salt, in which case a solution is prepared by the addition of the appropriate acid to the base component dispersed in a pharmaceutically acceptable non-toxic solvent, as, for example, water, glycerin, ethyl alcohol, propylene glycol and mixtures of these. In this way, solutions for pharmaceutical dispensing may be readily prepared. The preferred equivalents used are stoichiometric equivalents of both the acid and the base component.

EXAMPLE 11

To prepare tablets, 20 grams of morpholine ethanol citrate are mixed with 20 gm. of powdered corn starch. To this mixture is added 5 gm. of powdered lactose and 0.1 gm. of gum arabic, and the whole uniformly wetted with a mixture of 20 parts of ethanol and 80 parts of water. The uniformly wetted mass is then passed through a No. 16 mesh sieve and the resulting granules dried at about 45° C. To the dry granular material is then added 0.25 gram magnesium stearate and the resulting mixture is compressed into appropriately shaped tablets, each containing 200 mgm. of morpholine ethanol citrate. Should it be desired to add coloring to the tablet, then any of the pharmaceutically suitable coloring agents is mixed in the appropriate amounts with the magnesium stearate and added to the mixture.

EXAMPLE 12

In place of the morpholine ethanol citrate used in Example 9 above, there may be substituted equalivalent amounts of the pharmaceutically acceptable salts of morpholine ethanol, as for example, morpholine ethanol nicotinate, morpholine ethanol malate, morpholine ethanol maleate, morpholine ethanol glutamate, morpholine ethanol salicylate and morpholine ethanol tartrate, or the esters, morpholine ethyl tropate, morpholine ethyl mandelate and morpholine ethyl carbamate or the acid salt of the respective ester, the remainder of the steps being the same.

EXAMPLE 13

Should it be desired to utilize the pharmaceutically acceptable salts of morpholine ethanol, the esters, morpholine ethyl tropate, morpholine ethyl mandelate and morpholine ethyl carbamate, as well as their respective salts, in the form of capsules for oral administration to animals, then these may be prepared by filling an appropriate capsule directly with the active material so that each capsule contains 200 mg. of active material. Should it be desired to use a diluent in the preparation of the capsule dosage form, then powdered corn starch, powdered potato starch, powdered sucrose or powdered lactose may be used. The ratio of the diluent to the active ingredient may be from 1 to 10 parts of diluent for each part of active ingredient used. After suitable blending, the mixture is then filled into capsules of desired shape and size, so that each unit dose will contain 200 mg. of the appropriate active ingredient.

EXAMPLE 14

Solutions for oral administration may be prepared by dissolving the pharmaceutically acceptable salts of morpholine ethanol, morpholine ethyl tropate, morpholine ethyl mandelate, morpholine ethyl carbamate or the salts of the esters, in a non-toxic liquid vehicle or carrier, as for example, water, ethanol, glycerin, propylene glycol, polyoxyethylene glycol, or mixtures of these. Suitable flavoring and coloring agents may be added if desired.

A liquid dose form of the pharmaceutically acceptable salts of morpholine ethanol or of the esters, morpholine ethyl tropate, morpholine ethyl mandelate, and morpholine ethyl carbamate, should be adjusted in volume, preferably so that each unit dose of 5 cc. (teaspoonful) will contain 200 mg. of the active base compound, morpholine ethanol, although larger or smaller unit doses may be used.

EXAMPLE 15

Suppositories of the pharmaceutically acceptable salts of N-morpholine ethanol, N-morpholine ethyl tropate, N-morpholine ethyl mandelate, N-morpholine ethyl carbamate and the respective acid salts of the esters, may be prepared by mixing the selected therapeutic compound with a suitable suppository vehicle, such as cocoa butter, polyoxyethylene glycol of a molecular weight from 2,000 to 6,000 (these latter compounds are known to commerce as "Carbowax") or glycerin-gelatin compositions. The appropriate quantity of the active therapeutic compounds is dispersed in the suppository base material by either trituration or admixture while the base composition is in a molten state. After the suppository mass has been formed, pharmaceutically desirable suppositories may be obtained by extrusion or molding. The range in concentration of active compound for each suppository is from 100 to 750 mg. of the active ingredient, with a preferred range of 200 mg. per suppository.

EXAMPLE 16

When it is desired to obtain a blood level of the pharmaceutically acceptable salts of morpholine ethanol, morpholine ethyl tropate, morpholine ethyl mandelate, morpholine ethyl carbamate or the acid salts of the esters, then this may be accomplished by administering a preferred dosage form, such as tablets, capsules, suppositories or liquid preparations, by either the oral, rectal or parenteral routes. The active therapeutic compound is rapidly absorbed from the gastrointestinal tract or the particular tissue site and appears in the blood stream within 15 minutes to one-half hour after administration. The peak blood level is observed within 1 to 2 hours after administration of the drug. The blood level of the active ingredient persists, decreasing slowly as the drug is excreted through the normal metabolic pathways. A uniform blood concentration of the drug may be maintained by administering intermittent dosages during the day. The compound may be administered for prolonged periods of time without addiction or cumulative toxic manifestations. Such blood levels of the active ingredient as develop after the administration of the appropriate dosage form will be found useful for the relief of anxiety tension states or tension-induced muscle spasm. The exact daily dosage requirements of the patient will depend upon the intensity and depth of symptoms evidenced by the individual patient. A range in dosage of from 100 mg. to 750 mg. of the active therapeutic compound may be administered from 1 to 6 times daily. However, it will be found that 200 mg. of the active therapeutic compound, administered 3 to 4 times per day, will be adequate to generally relieve the anxiety tension state of the average patient.

It is not desired to be limited except as set forth in the following claims, the above description being by way of illustration of the invention.

What is claimed is:
1. An acid salt of N-morpholine ethanol selected from the group consisting of N-morpholine ethanol tartrate, N-morpholine ethanol malate, N-morpholine ethanol maleate, N-morpholine ethanol glutamate, N-morpholine ethanol salicylate, N-morpholine ethanol nicotinate and N-morpholine ethanol citrate.
2. N-morpholine ethanol tartrate.
3. N-morpholine ethanol malate.
4. N-morpholine ethanol maleate.
5. N-morpholine ethanol glutamate.
6. N-morpholine ethanol nicotinate.
7. N-morpholine ethanol citrate.
8. N-morpholine ethanol salicylate.
9. A pharmaceutical composition comprising a pharmaceutical carrier and the compound of claim 1.

References Cited by the Examiner
UNITED STATES PATENTS

| | | | |
|---|---|---|---|
| 2,173,069 | 9/1939 | Ulrich et al. | 260—247.7 |
| 2,854,379 | 9/1958 | Fancher | 167—65 |
| 2,868,786 | 1/1959 | Siemer et al. | 260—247.2 |
| 2,872,374 | 2/1959 | Beiler et al. | 167—65 |
| 2,953,562 | 9/1960 | Schuler et al. | 260—247.2 |

HENRY R. JILES, *Acting Primary Examiner.*

NICHOLAS S. RIZZO, *Examiner.*

JOSE TOVAR, *Assistant Examiner.*

Disclaimer 3,274,055.—*Alfred Halpern*, Great Neck, Lake Success, N.Y. ACID ADDITION SALTS OF MORPHOLINE ETHANOL. Patent dated Sept. 20, 1966. Disclaimer filed May 29, 1968, by the assignee, *Synergistics, Inc.*

Hereby enters this disclaimer to claim 9 of said patent.
[*Official Gazette July 16, 1968.*]